US006894846B1

United States Patent
He et al.

(10) Patent No.: US 6,894,846 B1
(45) Date of Patent: May 17, 2005

(54) OPTICAL ADD/DROP APPARATUS AND THE METHOD FOR MAKING THE SAME

(75) Inventors: Chun He, Fremont, CA (US); Steven Zhu, Fremont, CA (US)

(73) Assignee: Alliance Fiber Optic Products, Sunnyvale, CA (US)

( * ) Notice: Subject to any disclaimer, the term of this patent is extended or adjusted under 35 U.S.C. 154(b) by 0 days.

(21) Appl. No.: 10/698,176

(22) Filed: Oct. 30, 2003

(51) Int. Cl.[7] .............................................. G02B 13/00
(52) U.S. Cl. ................................. 359/722; 359/653
(58) Field of Search .......................... 359/722, 652–654

(56) References Cited

U.S. PATENT DOCUMENTS

| 5,583,683 | A | | 12/1996 | Scobey ........................ 398/79 |
| 5,612,824 | A | * | 3/1997 | Si et al. ....................... 359/652 |
| 5,799,121 | A | | 8/1998 | Duck ........................... 385/47 |
| 2002/0094162 | A1 | * | 7/2002 | Li et al. ........................ 385/34 |
| 2003/0081897 | A1 | * | 5/2003 | Itoh et al. ..................... 385/34 |
| 2003/0090809 | A1 | * | 5/2003 | Wu et al. ..................... 359/652 |
| 2003/0103725 | A1 | | 6/2003 | Li ................................. 385/34 |

* cited by examiner

*Primary Examiner*—Georgia Epps
*Assistant Examiner*—M. Hasan
(74) *Attorney, Agent, or Firm*—Joe Zheng

(57) ABSTRACT

New designs of optical devices, particularly for adding or dropping a selected wavelength or a group of wavelengths are disclosed. In one embodiment, an optical filter is positioned a distance from a first lens to form an assembly with a mechanical axis. The optical filter is configured at a selected wavelength and reflecting light beams at wavelengths other than the selected wavelength and transmitting a light beam at the selected wavelength. The distance is obtained with respect to a reflection measurement of a light beam at a wavelength other than the selected wavelength such that the reflection measurement is minimized. A second lens is initially positioned towards the optical filter. Before being fixed with respect to the assembly, the second lens is laterally shifted from the mechanical axis of the assembly to collect with a minimum loss a light beam refracted from the assembly. Such lateral shift also benefits when a light beam comes out from the second lens.

20 Claims, 10 Drawing Sheets

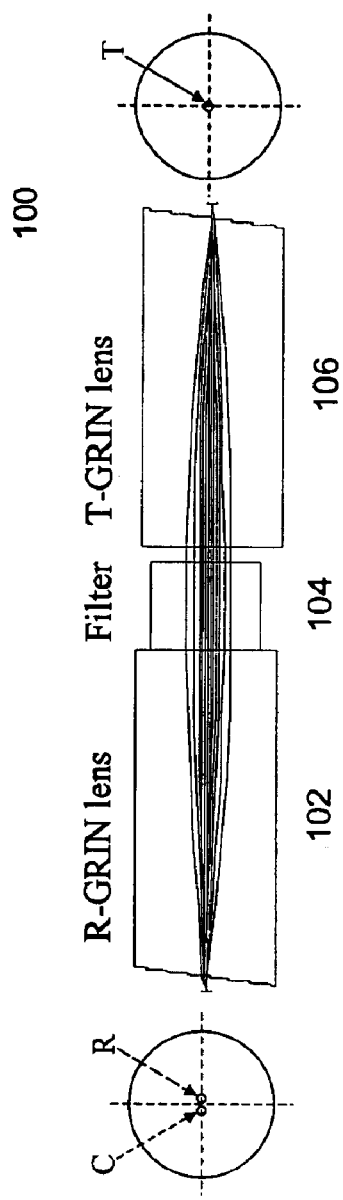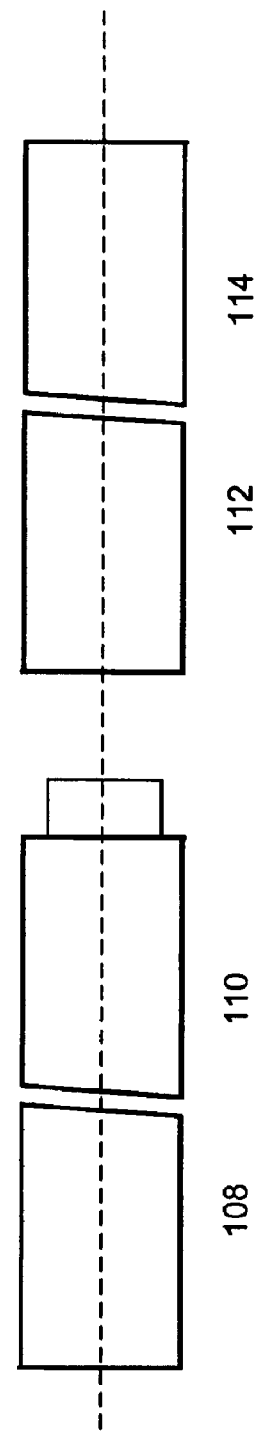
FIG. 1A
FIG. 1B

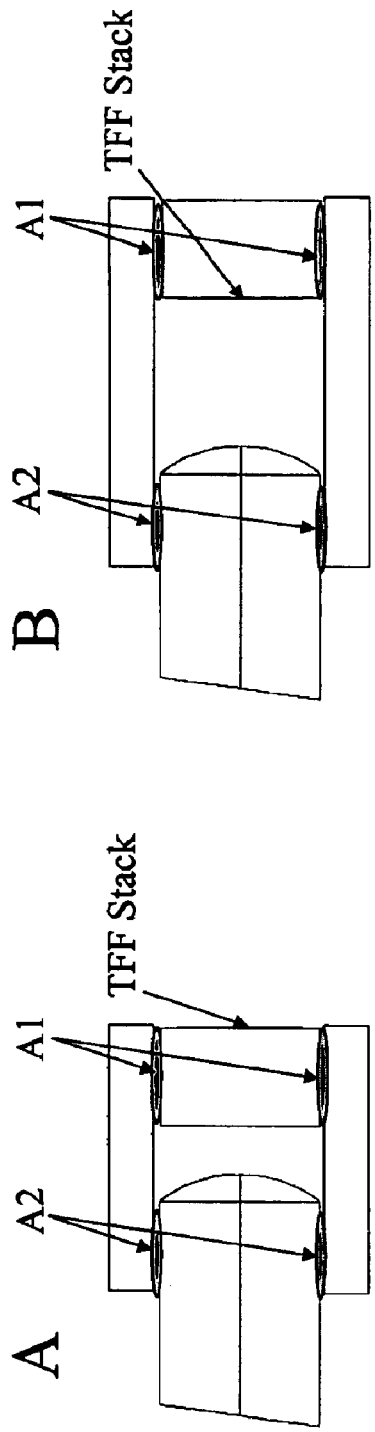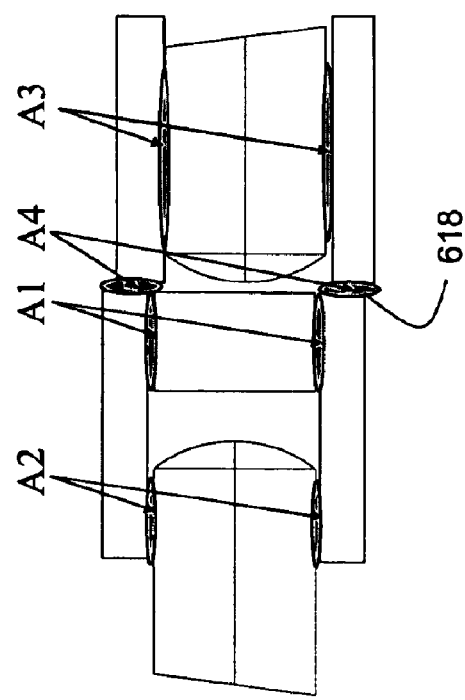
FIG. 6B
FIG. 6C
FIG. 6E

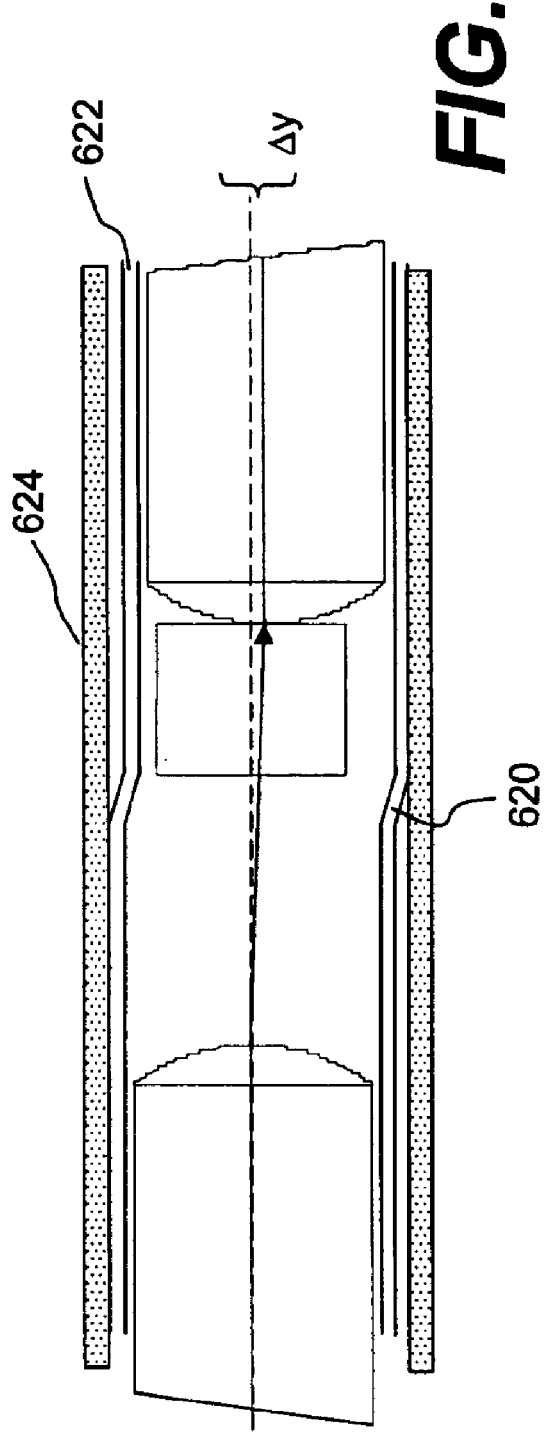

OPTICAL ADD/DROP APPARATUS AND THE METHOD FOR MAKING THE SAME

BACKGROUND OF THE INVENTION

1. Field of the Invention

The invention is generally related to the area of optical communications. In particular, the invention is related to optical add/drop devices and the method for making the same.

2. The Background of Related Art

The future communication networks demand ever increasing bandwidths and flexibility to different communication protocols. Fiber optic networks are becoming increasingly popular for data transmission due to their high speed and high capacity capabilities. Wavelength division multiplexing (WDM) is an exemplary technology that puts data from different sources together on an optical fiber with each signal carried at the same time on its own separate light wavelength. Using the WDM system, up to 80 (and theoretically more) separate wavelengths or channels of data can be multiplexed into a light stream transmitted on a single optical fiber. To take the benefits and advantages offered by the WDM system, there require many sophisticated optical network elements.

Optical add/drop devices are those elements often used in optical systems and networks. For example, an exchanging of data signals involves the exchanging of matching wavelengths from two different sources within an optical network. In other words, the multi-channel signal would drop a wavelength while simultaneously adding a channel with a matching wavelength at the same network node.

A commonly used optical add/drop device is what is called a three-port device. As the name suggests, a three-port device has three ports, each for a multi-channel signal, a dropped or added signal or a multi-channel signal without the dropped or added signal. FIG. 1A shows a typical design of a three-port device 100. The device 100 includes a first GRIN lens 102, a multi-layer thin film filter 104 and a second GRIN lens 104. In general, a dual-fiber pigtail is coupled to or positioned towards the first GRIN lens 102, and a single-fiber pigtail is coupled to or positioned towards the second GRIN lens 106. Essentially the two GRIN lenses 102 and 106 accomplish the collimating means for coupling an optical signal with multi channels or wavelengths in and out of a common port (C), a transmission port (T), and a reflection port (R). FIG. 1B shows a pair of GRIN lenses (108 and 110 or 112 and 114) used on one side to facilitate the collimating means. In any case, the three-port device 100 is known to have a very low coupling loss from the C-port to both the R-port and the T-port for use as a demultiplexing device, and vise versa as a multiplexing device.

The GRIN lens has a distinct advantage of having a flat end surface for attaching a thin film filter thereto, which is an essential step for assembling a three-port device. However, it is also known that GRIN lenses are expansive. Alternative lenses, such as conventional C-lenses or ball-lenses are being tried. U.S. Patent Application 2003/10103725 shows a three-port device using C-lenses, whereas a R-channel C-lens, a C-lens spacer, a thin film filter, another C-lens spacer, and a T-channel C-lens are all packaged into a piece of tubing. However, it can be appreciated from the following description of the present invention that the minimal insertion loss per the design of U.S. Patent Application 2003/0103725 could be hardly achieved with the proposed assembly process.

Accordingly, there is a great need for improved optical add/drop devices that are amenable to small footprint, broad operating wavelength range, enhanced impact performance, lower cost, and easier manufacturing process.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical devices, particularly for adding or dropping a selected wavelength or a group of wavelengths. For simplicity, a group of selected wavelengths or channels will be deemed or described as a selected wavelength hereinafter. According to one aspect of the present invention, an optical filter is positioned a distance from a first lens to form an assembly with a mechanical axis. The optical filter is configured at a selected wavelength and reflecting light beams at wavelengths other than the selected wavelength and transmitting a light beam at the selected wavelength. The distance is obtained with respect to a reflection measurement of a light beam at a wavelength other than the selected wavelength such that the reflection measurement is minimized.

A second lens is initially positioned towards the optical filter. Before being fixed with respect to the assembly, the second lens is laterally shifted from the mechanical axis of the assembly to collect with a minimum loss a light beam refracted from the assembly. Such lateral shift also benefits when a light beam comes out from the second lens.

According to one embodiment, the present invention is a method for assembling an optical device, the method comprising forming a first assembly including a first lens assembly and an optical filter, the optical filter reflecting light beams at wavelengths other than a selected wavelength and transmitting a light beam at the selected wavelength, wherein the first assembly possesses a mechanical axis, forming a second assembly including a second lens assembly, positioning initially the first assembly and the second assembly coaxially with the optical filter facing the second assembly and adjusting the second assembly with respect to the mechanical axis of the first assembly such that any light beam refracting from the first assembly is collected with a minimum loss by the second assembly.

According to another one embodiment, the present invention is an optical apparatus comprising a first assembly including a lens and an optical filter configured at a selected wavelength and reflecting light beams at wavelengths other than the selected wavelength and transmitting a light beam at the selected wavelength, wherein the first assembly possesses a mechanical axis, a second assembly including a second lens, and a sleeve to encapsulate the first and second assemblies that are so adjusted in such way that the second assembly is off the mechanical axis of the first assembly, as a result, any light beam refracting from the first assembly collected with a minimum loss by the second assembly.

One of the objects, features, advantages of the present invention is to provide optical add/drop devices that are amenable to small footprint, broad operating wavelength range, enhanced impact performance, lower cost, and easier manufacturing process.

Other objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

FIG. 1A shows a typical design of a three-port device;

FIG. 1B shows a pair of GRIN lenses used for the collimating means on one side;

FIG. 6B and FIG. 6C show respectively a filter (e.g., a thin film filter or TTF) being inserted in a short tubing or sleeve and positioned or bonded with a type of bonding material A1 (e.g., adhesive) with the TTF side facing either the outside or facing the lens;

FIG. 6E shows an exemplary configuration of conjoining two assemblies that have been adjusted to maximize transmission between the two assemblies;

FIG. 6F shows an exemplary configuration of a sleeve encapsulating conjoined two assemblies;

DETAILED DESCRIPTION OF THE PREFERRED EMBODIMENT

The present invention pertains to new designs of optical devices particularly used to add or drop a selected wavelength to wavelengths other than the selected wavelength. To achieve a minimized insertion loss and low cost of the devices, inexpensive lenses such as C-lenses are used to collimate light beams. To accommodate the unique features of the lenses, the location of an optical filter (e.g., a thin film filter) with respect to such a lens is determined by a measurement of reflection. When aligning with another such a lens, a lateral shift from the axis of the former lens is made to accommodate light beams refracted therefrom due to a slanted surface of the former lens upon which the light beams are projected. The exact lateral shift is obtained by a measurement of transmission.

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 2:
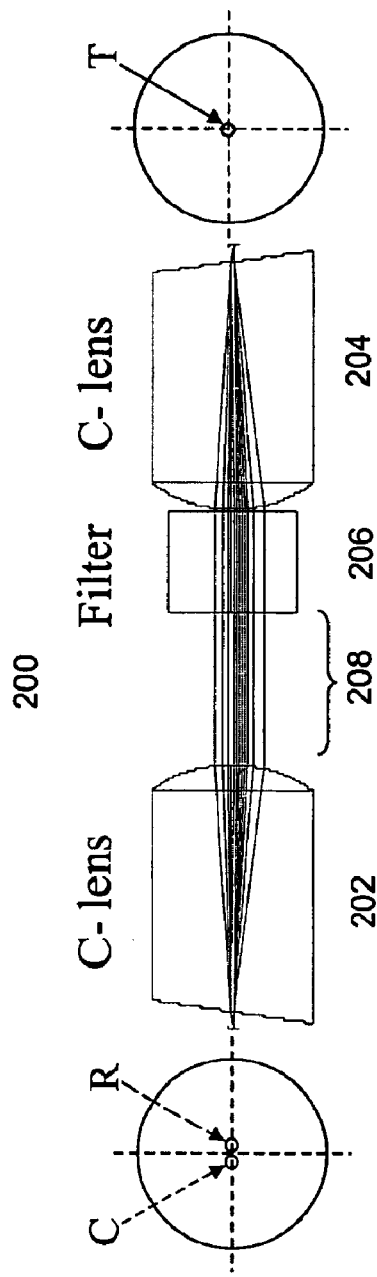
FIG. 2 shows, according to one embodiment of the present invention, an exemplary design that uses C lenses and as collimating means, and still achieves very low coupling loss for both the R-port and T-port.

Referring now to the drawings, in which like numerals refer to like parts throughout the several views. FIG. 2 shows, according to one embodiment of the present invention, an exemplary design 200 that uses C lenses 202 and 204 as collimating means, and still achieves very low coupling loss for both the R-port and T-port. As used herein, R-port means one end of the optical device with two fiber pigtails, and T-port means another end of the optical device with one fiber pigtail. When the optical device is used to multiplex signals, the T-port receives a light beam at a selected wavelength $\lambda x$ that is to be multiplexed into a group of beams at wavelengths ($\lambda 1, \lambda 2, \ldots \lambda N$) other than the selected wavelength $\lambda x$ from one of the two fiber pigtails of the R-port. The other one of the two fiber pigtails of the R-port subsequently produces a multiplexed signal including all wavelengths $\lambda 1, \lambda 2, \ldots \lambda x, \ldots \lambda N$. Likewise, when the optical device is used to demultiplex signals, the R-port receives from one of its two fiber pigtails a group of beams at wavelengths $\lambda 1, \lambda 2, \ldots \lambda x, \ldots \lambda N$. The other one of the two fiber pigtails of the R-port subsequently produces a group of signals including all wavelengths $\lambda 1, \lambda 2, \ldots \lambda N$ except for the selected wavelength $\lambda x$, meanwhile a light beam at the selected wavelength $\lambda x$ is output from the fiber pigtail of the T-port.

In a process of achieving a minimum insertion loss of the design 200, it is noticed that the insertion loss is a function of a distance D or a gap between the C lens 202 and a filter 206, wherein the filter 206 is so chosen to pass through a selected wavelength. Typically, the gap should be maintained between 1.8 mm to 5 mm, depending on the specific lens used. This is in contrast to the approaches of using GRIN lenses as collimating means in which the filter is attached to the flat end of a GRIN lens without any gap, or with very small gap (0.005–0.05 mm).

Figure 3:
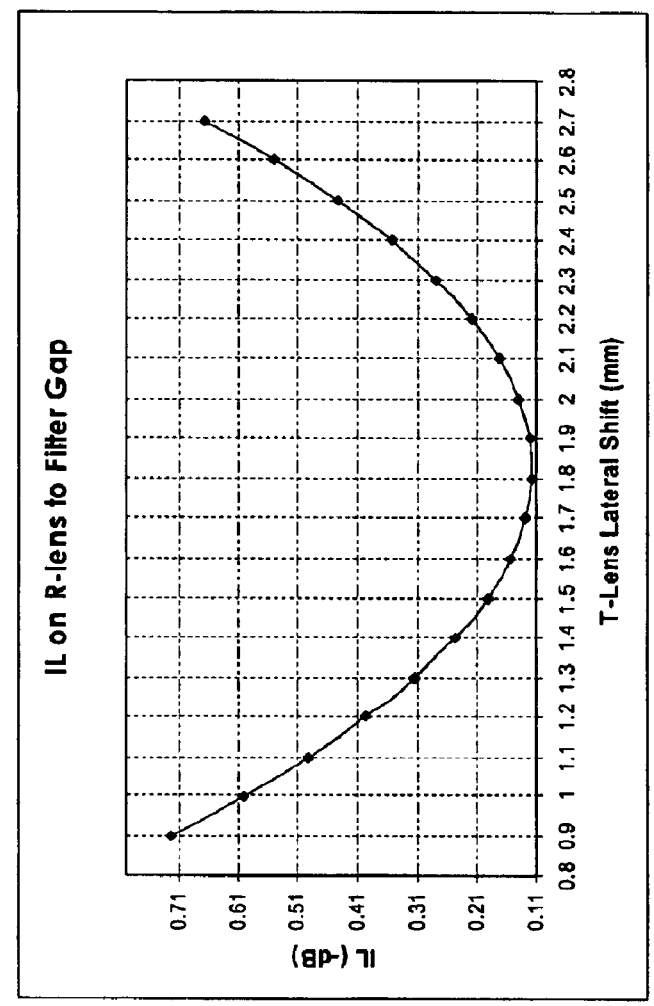
FIG. 3 shows the dependency of the R-channel loss as a function of the distance D between an exemplary filter and a selected C lens.

FIG. 3 shows the dependency of the R-channel loss as a function of the distance D between an exemplary filter and a selected C lens. As used herein, a R-channel means an optical path for reflection and a T-channel means an optical path for transmission. It can be observed from FIG. 3 that, for the selected C lens, a gap of 1.8 mm would provide a minimum insertion loss of far less than 0.15 dB. Accordingly, an assembly of the C lens 202 and the filter 206 of FIG. 2 will require an adjustment based on a reflection measurement. According to one embodiment, a group of light signals at wavelengths other than the selected wavelength of the optical filer is provided. The signals are reflected by the optical filer. The measurement of the reflected signals is to reach a maximum when the gap between the C lens 202 and the filter 206 reaches a certain distance.

Figure 4A:
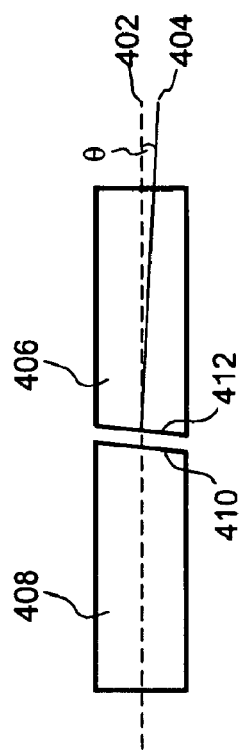
FIG. 4A shows a collimator using two lenses.

Referring now to FIG. 4A, there is shown a collimator 400. The collimator 400 shows a pointing error denoted by an angle θ between its mechanical axis 402 and the collimated beam axis 404. The collimator 400 includes an optical lens 406 and guiding or positioning means 408. In a typical optical application, a fiber or a core thereof is inserted into the positioning means 408. It is noted that the interface between the lens 406 and the positioning means 408 includes two congruent facets, namely both are slanted at the same angle. It is a common belief and indeed a practice that the end surfaces of the lens 406 and the receiving means 408 are angled in a similar manner such that a light beam coming out of the positioning means 408 will not reflect right back to its source.

Using an optical modeling and simulation tool, the inventors have uncovered that the pointing error for the conventional collimators, as shown in FIG. 4A, is intrinsic, and in fact, originated from the slanted facet, namely the end surface 412 of the lens 406. Depending on the characteristics of the lens 406 (e.g. GRIN lens, C lens, or Gradium lens), the end surface 412 of the lens 406 is made around 6~8 degree. With such slanted facet, the pointing error exists even when the dimensions and materials of the components used for assembling the collimator are perfect.

Figure 4B:
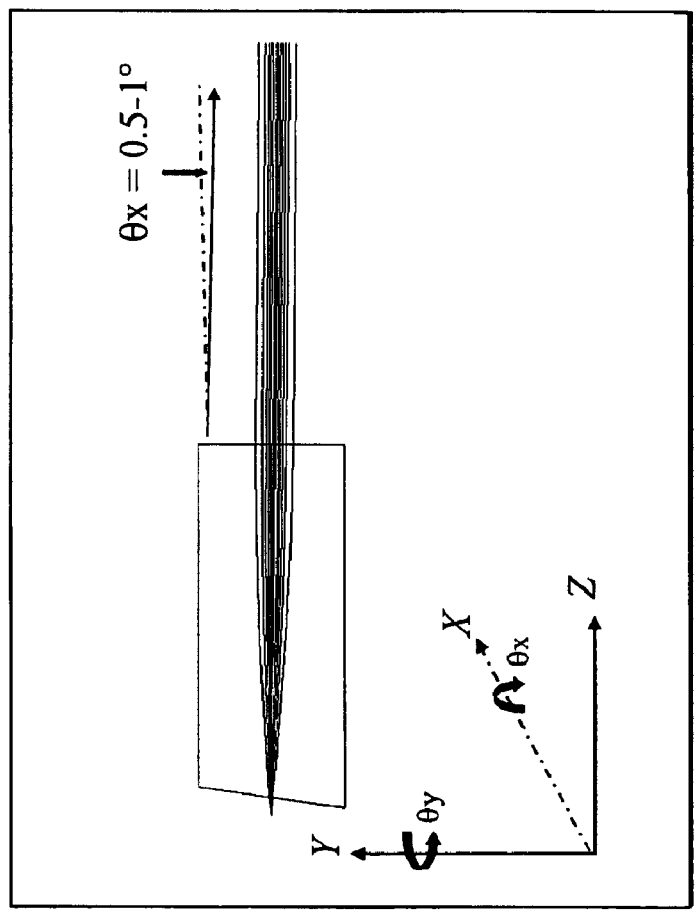
FIG. 4B shows a type of lens structure commonly used in the prior art collimators and the amount of the slanted angle.
Figure 4C:
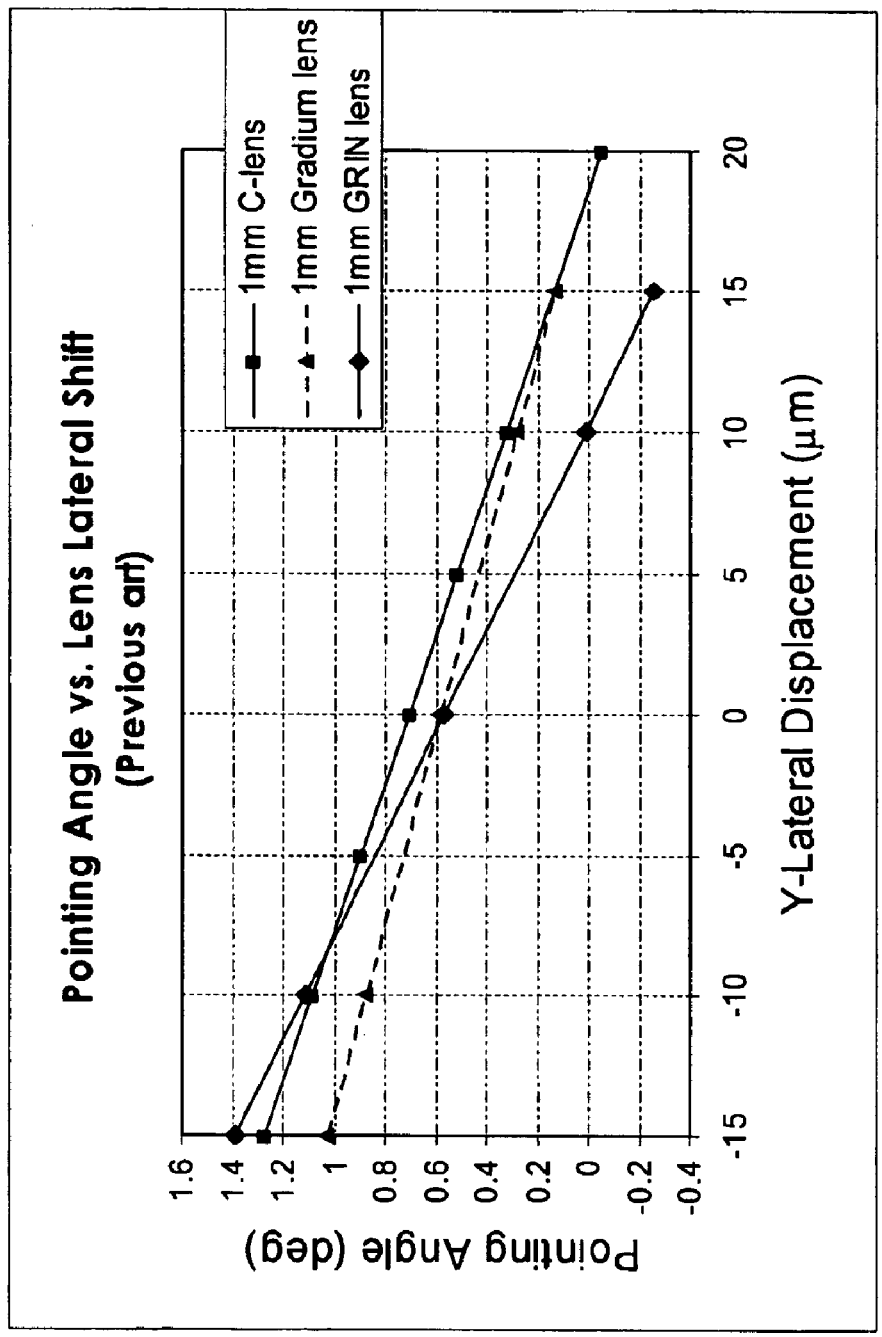
FIG. 4C shows quantitative plots of the pointing errors in three most commonly used commercial collimators.

With a commercially available collimator, the inventors have also quantitatively proved that the pointing error is a vector, in the Y-Z plane with a value in a range of 0.50 to 0.1° with the Z-axis, depending on what glass materials is used, the type of lens structure, and the amount of the slanted angle, as shown in FIG. 4B. The quantitative plots of three most commonly used commercial collimators are shown in FIG. 4C.

Figure 5:
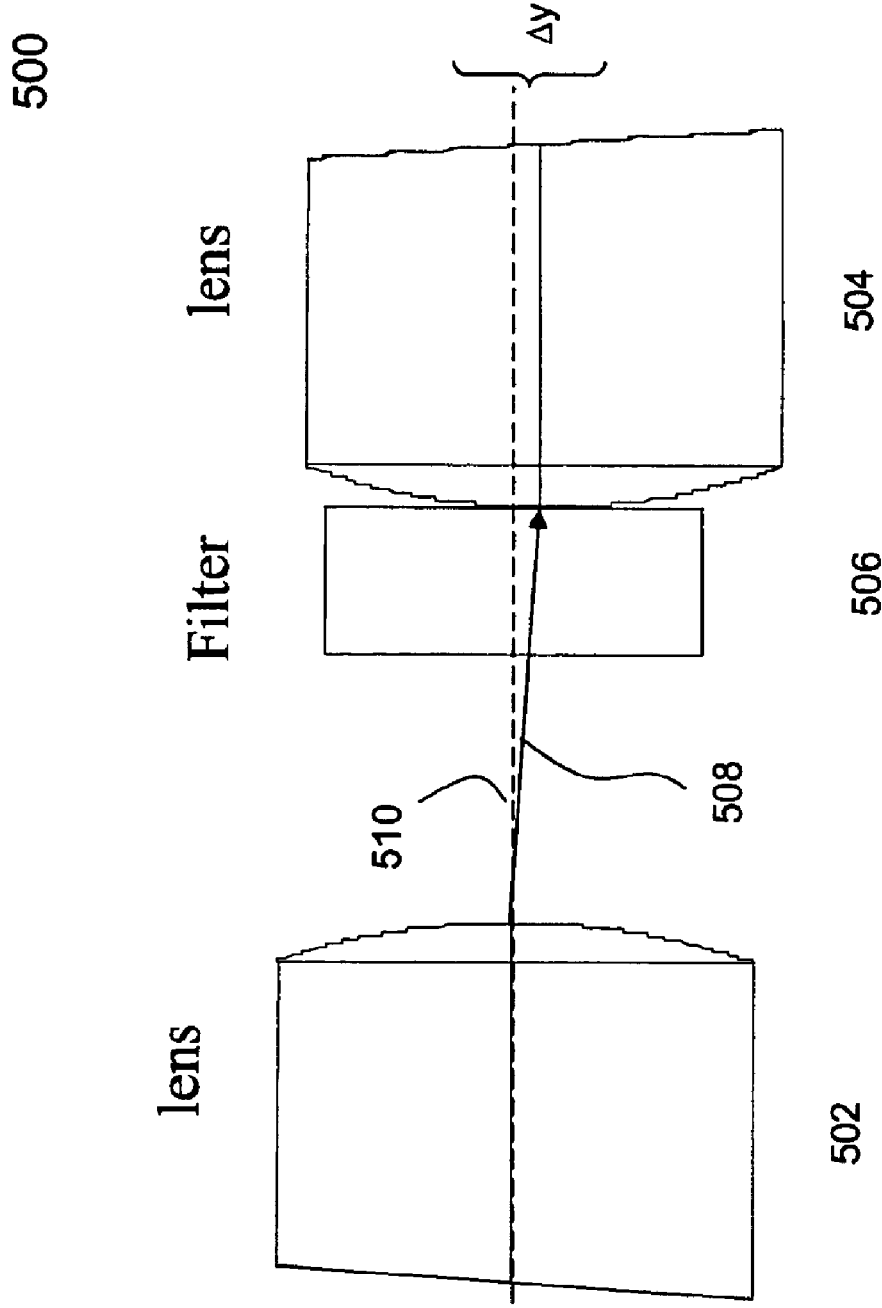
FIG. 5 shows, according to one embodiment of the present invention, an improved design over the design of FIG. 2.

FIG. 5 shows, according to one embodiment of the present invention, an improved design 500 over the design 200 of FIG. 2. The improved design 500 using lenses 502 and 504 as collimating means achieves even lower coupling loss for both the R-port and T-port.

To compensate for the pointing error due to the slanted surface of the lens 502, the lens 504 is shifted a lateral distance from the mechanical axis 510 such that the light beam refracting off the mechanical axis from the lens 502 (through the filter 506) can be optimally collected by the lens 504. The same applies when a light beam comes out of the lens 504, it can be optimally collected by the lens 502.

Figure 6A:
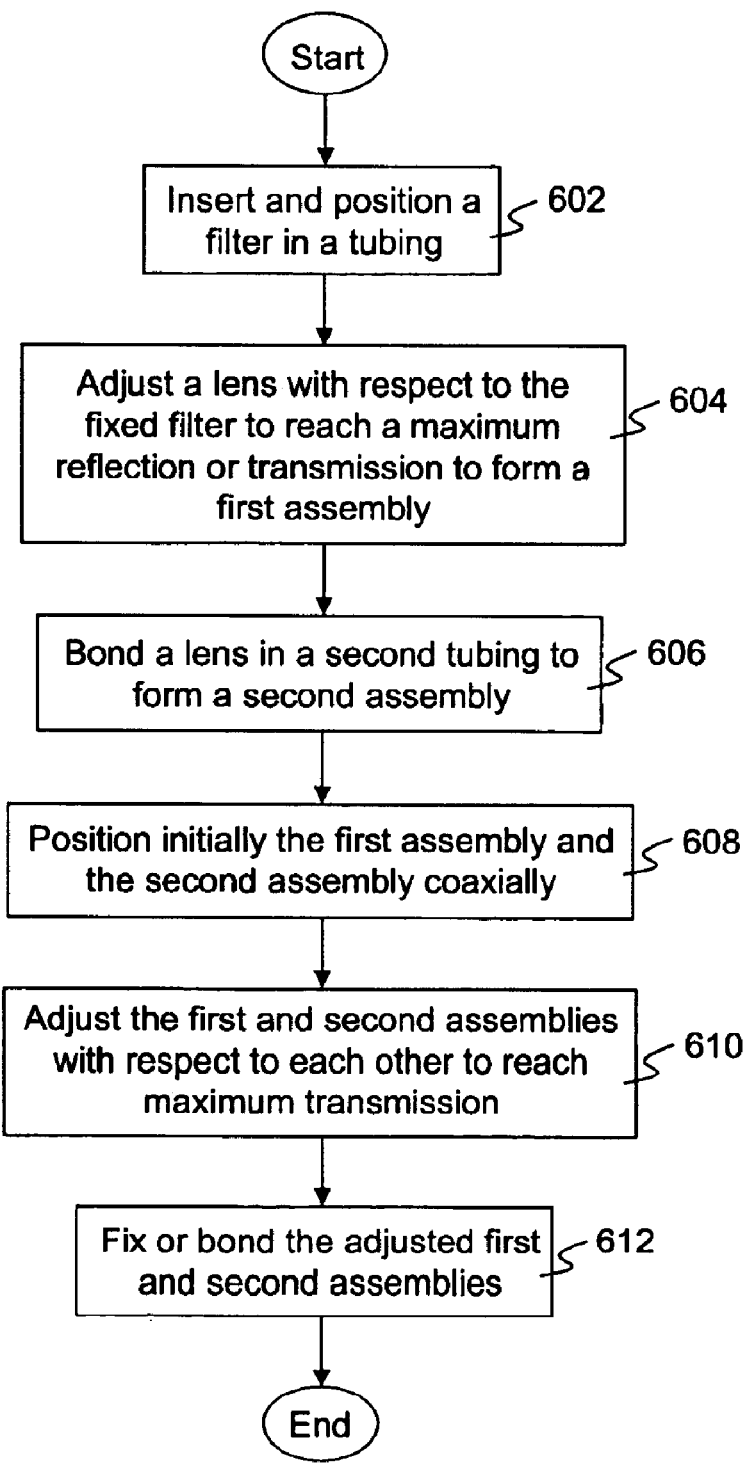
FIG. 6A shows a process flowchart of assembling an add/drop device in accordance with one implementation of the present invention.

Referring now to FIG. 6A, there shows a process flowchart 600 of assembling an add/drop device in accordance with one implementation of the present invention. At 602, a filter (e.g., a thin film filter or TTF) is inserted in a short tubing or sleeve and positioned or bonded with a type of bonding material A1 (e.g., adhesive) with the TTF side facing either the outside as shown in FIG. 6B, or facing the lens (FIG. 6C). Before fixing a lens towards the filter, at 604 the lens is so adjusted that reflection from the filter or transmission through the filter reaches a maximum. As a result, a first assembly is formed.

At 606, a second tubing is provided with a lens to form a second assembly. The first and second assemblies are then initially positioned coaxially to facilitate subsequent optimal adjustment at 608. Giving the setting at 608, it is now possible to adjust the two assemblies with respect to each other to reach a maximum transmission at 610.

Figure 6D:
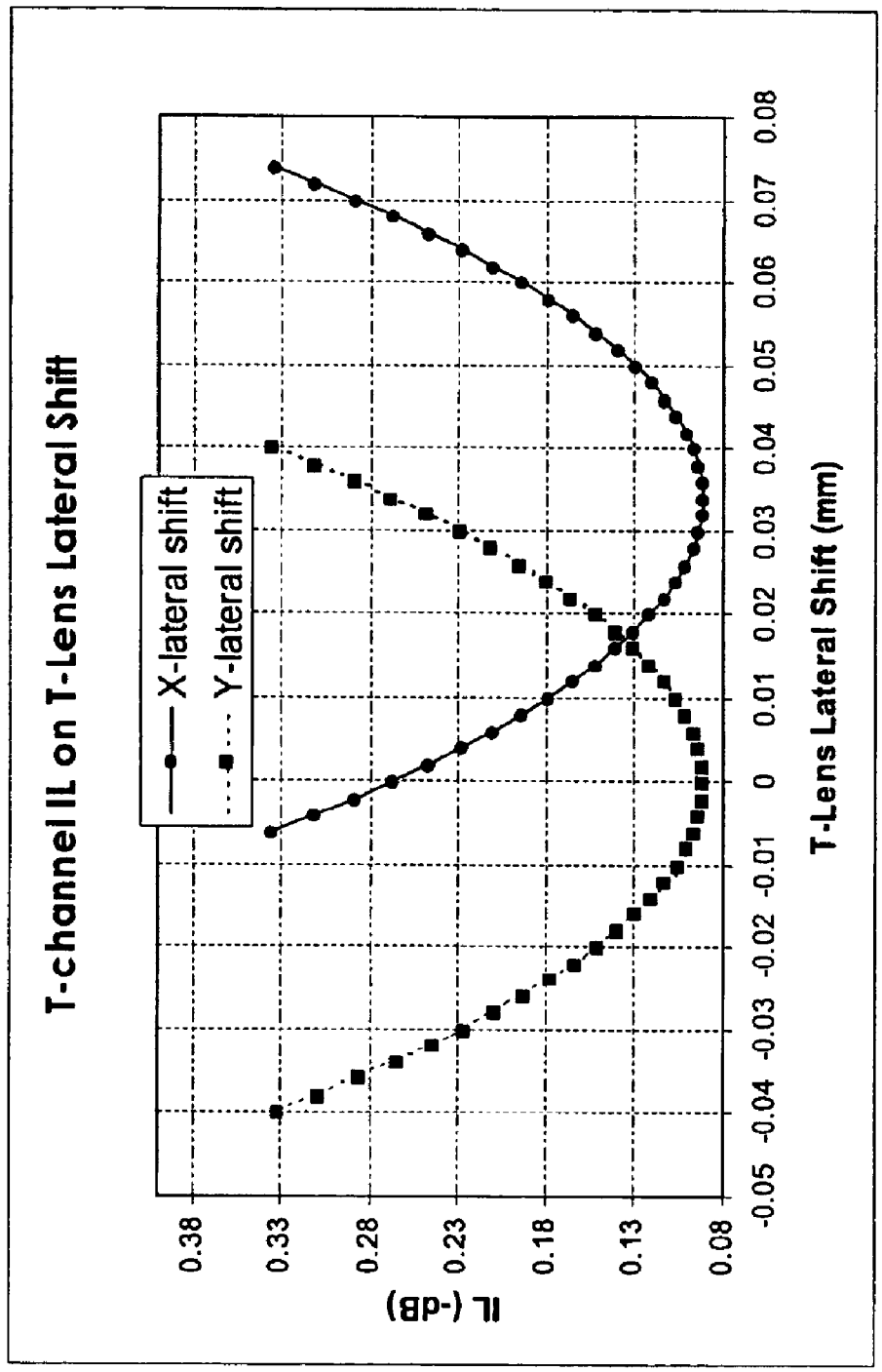
FIG. 6D shows the sensitivities of the coupling between the two assemblies versus the X and Y lateral shifts, in which C-lenses are used.

According to one embodiment, a multiplexed signal including all wavelengths λ1, λ2, ... λx, ... λN, is provided to the first assembly. All except for the selected wavelength λx are reflected. The light beam at the selected wavelength λx is refracted to the second assembly. The second assembly is adjusted with respect to the mechanical axis of the first assembly, typically a small lateral shift from the axis to optimally collect the light beam with a minimum loss. FIG. 6D shows the sensitivities of the coupling between the two assemblies versus the X and Y lateral shifts, in which C-lenses are used. It is clear that the lateral shifts are essential for achieving optimal alignment for the assemblies, and its sensitivity exceeds the tolerance of the present optical manufacturing capabilities for components such as C-lens, fiber pigtails, and glass tubes. Alternatively, the second assembly may be adjusted laterally along the mechanical axis of the first assembly.

At 612, the adjusted first and second assemblies are fixed or bonded to keep the adjustment. According to one embodiment, the two assemblies are conjoined at 618 in FIG. 6E with a type of adhesive. According to another embodiment, a sleeve 624 is provided to encapsulate the conjoined two assemblies as shown in FIG. 6F.

Given the description of assembling an optical device, for example, to add/drop a selected, one may perform the following in reference to FIG. 6B or 6C:

1. hold the filter-tube assembly with a XYZ adjustable stage assembly, either the C-lens or the dual-fiber pigtail with a one-dimensional stage, and the other with a fixed stage;
2. adjust the gap between the lens and the filter-tube assembly by the one-dimensional stage, and then align the XYZ stage of the pigtail, searching for the minimal R-channel insertion loss;
3. the optimal gap between the lens and the filter is then set and fixed with a type of bonding material A2. Now the assembly can be used as a standard R-channel lens-filter assembly used in an optical add/drop three-port device;
4. adjust the lens for the T-channel laterally with respect to the lens for the R-channel to achieve optimal T-channel coupling. Furthermore, the final adjustment on the T-channel C-lens will be performed after the T-channel pigtail adjustment, in order to achieve the optimal coupling to the T-channel fiber.

Figure 7:
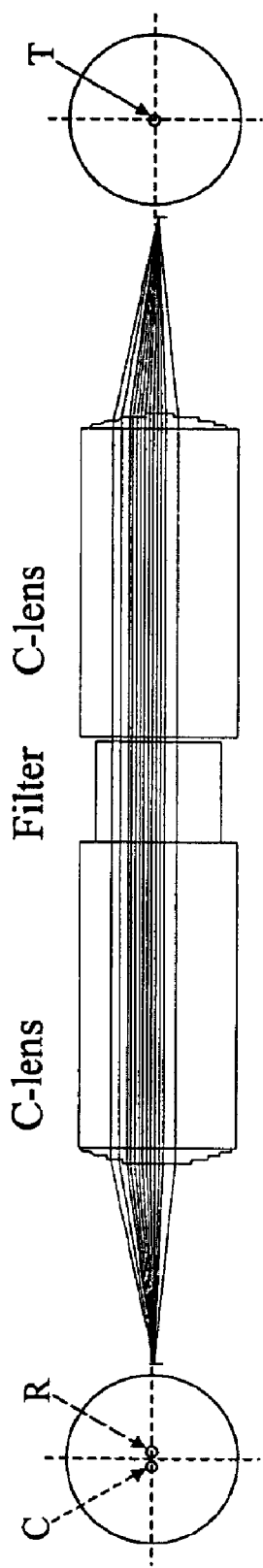
FIG. 7 shows another exemplary design of using C-lenses.

Referring now to FIG. 7, there shows another exemplary design 700 that has achieved very low coupling loss for both the R-port and T-port. The TTF is directly attached to the flat end of the C-lens in the R-port with adhesive. The gap between the TTF and the T-port C-lens should maintain at small gap (0.02–0.5 mm). However, the back gaps between the pigtails to C-lens convex surfaces have to be maintained around 1.9–2.5 mm such that the reflection is maximum. As a result, the beam size on the C-lens is large. In addition, the convex surface of the C-lens has to be aspherical to reduce the spherical aberration. The manufacturing cost of this type of C-lens is typically higher than that of FIG. 5.

Figure 8:
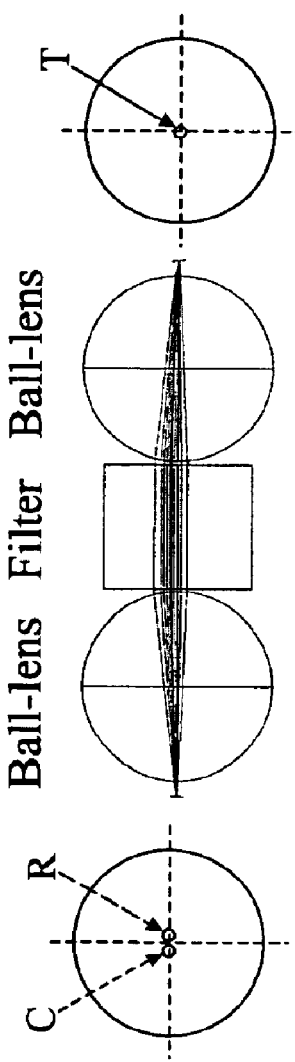
FIG. 8 shows that ball-lenses are used as collimating means in a three-port device and also can achieve low coupling loss in accordance with the present invention.

FIG. 8 shows that ball-lenses are used as collimating means in a three-port device 800 and also can achieve low coupling loss in accordance with the present invention. One of the features of using the ball-lenses is that the size of the resulting device can be very compact. Typically, the length of the device is 25% less in length than the conventional GRIN lens based device, and the cost of the ball lens is much lower than that of the GRIN lens.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. A method for assembling an optical device, the method comprising:

forming a first assembly including a first lens assembly and an optical filter, the optical filter reflecting light beams at wavelengths other than a selected wavelength and transmitting a light beam at the selected wavelength, wherein the first assembly possesses a mechanical axis;

forming a second assembly including a second lens assembly;

positioning initially the first assembly and the second assembly coaxially with the optical filter facing the second assembly;

adjusting the second assembly laterally away from the mechanical axis of the first assembly such that any light beam refracting from the first assembly is collected with a minimum loss by the second assembly, and encapsulating the first assembly and the second assembly in a sleeve.

2. The method of claim 1, wherein the sleeve is not straight because of the second assembly positioned off the mechanical axis of the first assembly.

3. The method of claim 2, wherein the sleeve is again encapsulated in a straight sleeve.

4. The method of claim 1, wherein the forming of the first assembly comprises:

inserting the optical filter near an end of a tubing; and placing the first lens in the tubing afterwards but a distance away from the optical filter, where the distance is adjusted with respect to a reflection measurement of a light beam at a wavelength other than the selected wavelength such that the reflection measurement is minimum.

5. The method of claim 4, wherein both of the optical filter and the first lens are respectively bonded to the tubing.

6. The method of claim 4, wherein the optical filter and the first lens are respectively bonded to the tubing by a type of adhesive.

7. The method of claim 1, wherein the forming of the second assembly comprises inserting the second lens into a tubing and bonding the second lens to the tubing by a type of adhesive.

8. The method of claim 1, wherein the adjusting of the second assembly with respect to the mechanical axis of the first assembly comprises:

providing the light beam at the selected wavelength through the first assembly;

measuring a transmission of the light beam from the second assembly;

adjusting the second assembly off the mechanical axis of the first assembly such that the transmission of the light beam from the second assembly becomes minimum.

9. The method of claim 8, wherein both of the first and second lenses are C-lenses.

10. The method of claim 8, wherein both of the first and second lenses are ball-lenses.

11. An optical apparatus comprising:

a first assembly including a lens and an optical filter configured at a selected wavelength and reflecting light beams at wavelengths other than the selected wavelength and transmitting a light beam at the selected wavelength, wherein the first assembly possesses a mechanical axis;

a second assembly including a second lens; and a sleeve to encapsulate the first and second assemblies that are so adjusted in such way that the second assembly is off the mechanical axis of the first assembly, as a result, any light beam refracting from the first assembly collected with a minimum loss by the second assembly.

12. The optical apparatus of claim 11, wherein the tubing is not straight because of the second assembly positioned off the mechanical axis of the first assembly.

13. The optical apparatus of claim 11, wherein the tubing is again encapsulated in a straight sleeve.

14. The optical apparatus of claim 11, wherein the optical filter is fixed near an end of a tubing, and the lens is also fixed in the tubing a distance away from the optical filter, where the distance is obtained with respect to a reflection measurement of a light beam at a wavelength other than the selected wavelength such that the reflection measurement is minimum.

15. The optical apparatus of claim 14, wherein both of the optical filter and the first lens are respectively bonded to the tubing.

16. The optical apparatus of claim 14, wherein the optical filter and the first lens are respectively bonded to the tubing by a type of adhesive.

17. The optical apparatus of claim 11, wherein the lens in the second assembly is fixed to a tubing by a type of adhesive.

18. The optical apparatus of claim 11, wherein the first and second assemblies are positioned in the sleeve by:

providing the light beam at the selected wavelength through the first assembly;

measuring a transmission of the light beam from the second assembly;

adjusting the second assembly off the mechanical axis of the first assembly such that the transmission of the light beam from the second assembly becomes minimum.

19. The optical apparatus of claim 18, wherein both of the first and second lenses are C-lenses.

20. The optical apparatus of claim 18, wherein both of the first and second lenses are ball-lenses.

* * * * *